United States Patent [19]
Jinbo et al.

[11] Patent Number: 5,983,672
[45] Date of Patent: Nov. 16, 1999

[54] METHOD FOR MANUFACTURING OPTICAL COMPONENTS FOR USE IN THE ULTRAVIOLET REGION

[75] Inventors: Hiroki Jinbo, Kawasaki; Akiko Moriya; Norio Komine, both of Sagamihara, all of Japan

[73] Assignee: Nikon Corporation, Tokyo, Japan

[21] Appl. No.: 08/939,203

[22] Filed: Sep. 29, 1997

[30] Foreign Application Priority Data

Sep. 30, 1996 [JP] Japan .................................. 8-259948

[51] Int. Cl.$^6$ .......................... C03C 15/00; C03C 19/00; C03B 27/012
[52] U.S. Cl. ................... 65/30.1; 65/31; 65/61; 65/DIG. 8; 65/33.2
[58] Field of Search .............. 65/31, 32.1, 30.1, 65/33.2, 61, 105, 112, 104, 114, 117, 60.1, DIG. 8

[56] References Cited

U.S. PATENT DOCUMENTS

| | | |
|---|---|---|
| 2,659,665 | 11/1953 | Parsons et al. . |
| 3,468,646 | 9/1969 | Finn et al. . |
| 4,028,082 | 6/1977 | Krohn et al. . |
| 4,106,859 | 8/1978 | Doriguzzi et al. . |
| 4,193,783 | 3/1980 | Matsushita . |
| 4,911,743 | 3/1990 | Bagby . |
| 5,133,791 | 7/1992 | Yagami et al. . |
| 5,696,624 | 12/1997 | Komine et al. . |
| 5,776,219 | 7/1998 | Jinbo et al. . |

FOREIGN PATENT DOCUMENTS

| | | |
|---|---|---|
| 195 33 321 | 3/1996 | Germany . |
| 58-171004 | 10/1983 | Japan . |
| 60-131850 | 7/1985 | Japan . |
| 63-107 842 | 5/1988 | Japan . |
| 7-120633 | 5/1995 | Japan . |
| 1 295 352 | 3/1987 | U.S.S.R. . |
| 2 065 097 | 6/1981 | United Kingdom . |

OTHER PUBLICATIONS

G. W. Morey, "The Properties of Glass", pp. 173–196, 1938.
S. R. Scholes, "Handbook of the Glass Industry", pp. 68–69, 1941.
English Translation of JP 60–131850.
European Search Report (Feb. 19, 1998).

*Primary Examiner*—Stanley S. Silverman
*Assistant Examiner*—Jacqueline A. Ruller
*Attorney, Agent, or Firm*—Morgan, Lewis & Bockius LLP

[57] ABSTRACT

The present invention provides a method for manufacturing an optical component that have increased transmittance in the ultraviolet region of the spectrum. The method includes the steps of cutting out a part from a block material; polishing optical sides of the part; subjecting the part to heat treatment at a temperature of between 100 and 900° C.; and subjecting the part to acid treatment.

24 Claims, 4 Drawing Sheets

FIG. 4

| | a A.RMS | b SiO2 | c 10% | d (N.1) | e (N.2) | 193.4nm UV | 193.4nm φ | 240 | (N.3) b |
|---|---|---|---|---|---|---|---|---|---|
| A | 2 | × | × | × | ○ | | 98.95 | 240 | 98.25 |
| B | 2 | ○ | ○ | × | ○ | | 99.45 | | 99.38 |
| C | 2 | ○ | × | × | ○ | | 99.56 | | 99.15 |
| D | 2 | × | × | ○ | ○ | | 99.15 | | 98.58 |
| E | 2 | ○ | × | ○ | ○ | | 99.65 | | 99.25 |
| F | 2 | ○ | ○ | × | × | | 99.76 | | 99.74 |
| G | 2 | ○ | ○ | ○ | ○ | 99.80 (N.4) | | | 99.78 |
| H | 10 | ○ | ○ | ○ | ○ | | 99.72 | | 99.71 |
| I | 2 | ○ | ○ | ○ | ○ | | 99.86 | | 99.84 |
| J | 5 | ○ | ○ | ○ | ○ | | 99.80 | | 99.80 |

N.1) 200°C, 10 min.
N.2) Hg lamp (185nm: 1mW/cm2, 254nm: 10mW/cm2), 5 min, 1cm
N.3) Calculated internal transmittance, reflection loss assumed 0.
N.4) Value measured immediately after working

METHOD FOR MANUFACTURING OPTICAL COMPONENTS FOR USE IN THE ULTRAVIOLET REGION This application claims the benefit of Japanese patent application No. 08-259948, filed Sep. 30, 1996, which is hereby incorporated by reference.

BACKGROUND OF THE INVENTION

1. Field of the Present Invention

The present invention relates to an optical component, for example, a lens or a mirror, which is used in optical systems in a wavelength region of 400 nm or less (preferably 300 nm or less, such as an optical component for use in photolithography) and a method for manufacturing the same. More particularly, the present invention relates to a method of manufacturing optical components for use in UV photolithography that show a reduced surface loss in the UV region. The present invention improves the performance of the illumination lenses and projection lenses used in KrF and ArF excimer laser steppers using ultraviolet light sources with a wavelength of 300 nm or less.

2. Discussion of Related Art

An exposure apparatus known as a stepper has been used in photolithographic techniques where fine patterns of integrated circuits are exposed and transferred onto wafers made of semiconductors such as, for example, silicon. As Large Scale Integrated Circuits (LSI's) have become more highly integrated in recent years, the light sources used in such steppers have shifted to shorter wavelengths, i.e., from the g line (436 nm) to the i line (365 nm). More recently, the steppers have shifted to even shorter wavelengths, such as KrF (248 nm) and ArF (193 nm) excimer lasers.

Generally, the lens materials used in the illumination lenses or projection lenses of steppers consist mainly of optical glass with a high transmittance of the i line. On the other hand, in the case of KrF and ArF excimer lasers, synthetic fused silica and fluoride single crystals such as $CaF_2$ (fluorite) are used instead of conventional optical glass.

Such optical components generally must have a transmittance of 99.5% or greater in the wavelength region used. Furthermore, a reduction of surface loss also is an especially important quality requirement in optical components.

It has been found that for optical components used in a short wavelength region of 300 nm or less, the surface loss cannot be reduced to 0.5% or less using conventional polishing methods or cleaning methods. As a result of long years of diligent research concerning the causes of this problem, the present inventors have ascertained the following facts.

(1) Surface loss includes loss other than scattering caused by the surface roughness.

(2) Some surface loss is caused by the absorption of metal residues, such as, for example, polishing agents.

Over a period of many years, the present inventors have conducted experiments in order to verify the above-mentioned facts.

A method using a low-pressure mercury lamp made of synthetic fused silica as a light source is generally known as an ultraviolet cleaning method. This light source emits ultraviolet light at 185 nm and 254 nm. Since the energy of this light source is greater than the bonding energy of most organic compounds, chemical bonds are broken when this energy is absorbed by organic substances, so that radicals and molecules in an excited state can be generated. Ultraviolet light at 185 nm is absorbed by oxygen molecules so that $O_3$ is generated. $O_3$ absorbs ultraviolet light at 254 nm and generates active oxygen. This active oxygen reacts with the radicals and excited molecules of organic substances, so that the organic substances are decomposed.

In order to obtain an optical material that has an internal transmittance of 99.5% or greater, it is necessary to manufacture a material that contains few impurities or structural defects that cause internal absorption in the optical material. Accordingly, synthesis by flame hydrolysis is used as a method for manufacturing synthetic fused silica with few impurities or structural defects. In this method, an Si compound gas (which serves as a raw-material gas), a carrier gas, which transports the Si compound gas, and gases which are used for combustion/heating (e.g., $H_2$, $O_2$ gas, etc.), are caused to jet from a burner, and fine particles of $SiO_2$ that are produced in the flame are deposited on a target and simultaneously vitrified.

With respect to fact (1) discussed above, the relationship between surface roughness and transmittance was confirmed. FIGS. 1 and 2 show the respective relationships between surface roughness and the measured transmittance of experimentally manufactured optical components (φ 60×t10 mm parallel flat plates) at measurement wavelengths of 248 nm and 193 nm. Synthetic fused silica, which were all manufactured under identical conditions, were used as the measurement. Furthermore, the surface roughness was measured using an optical interference type surface roughness meter.

As shown in FIGS. 1 and 2, although the transmittance depends to a certain extent on the surface roughness, i.e., on the surface scattering loss, other factors also have an effect on the transmittance value.

This further shows that in addition to surface scattering, surface loss caused by absorption also largely influences the measurement of transmittance. It is thought that this absorption is caused by structural defects resulting from residual impurities and residual stress.

Even in cases where almost no metallic impurities such as $CeO_2$ are detected and the surface roughness is less than 1 Å RMS, the transmittance may still be lowered 0.5% or more compared to a theoretical transmittance. Thus, a problem remains.

SUMMARY OF THE PRESENT INVENTION

Accordingly, the present invention is directed to a method of manufacturing optical components for use in the ultraviolet region that substantially obviates one or more of the problems due to the limitations and disadvantages of the related art.

In one aspect of the present invention there is provided a method for manufacturing an optical component including the steps of cutting out a part from a block material, polishing optical sides of the part, subjecting the part to heat treatment at a temperature of 100 to 900° C., and subjecting the part to acid treatment.

In a second aspect of the invention, there is provided a method for manufacturing an optical component including the steps of cutting out a part from a block material, polishing optical sides of the part, subjecting the part to acid treatment, and subjecting the part to heat treatment at a temperature of 100 to 900° C.

In a third aspect of the invention, there is provided a method for manufacturing an optical component including the steps of cutting out a part from a block material, polishing optical sides of the part, subjecting the part to acid treatment, subjecting the part to an ultraviolet treatment, and subjecting the part to heat treatment at a temperature of 100 to 900° C.

It is to be understood that both the foregoing general description and the following detailed description are exemplary and explanatory and are intended to provide further explanation of the invention as claimed.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 4 is a table representing experimental data for a number of different samples.

DETAILED DESCRIPTION OF THE PREFERRED EMBODIMENTS

Reference will now be made in detail to the preferred embodiments of the present invention, examples of which are illustrated in the accompanying drawings.

To solve the problems described above, the present inventors first investigated the surface conditions of optical components.

Figure 3:
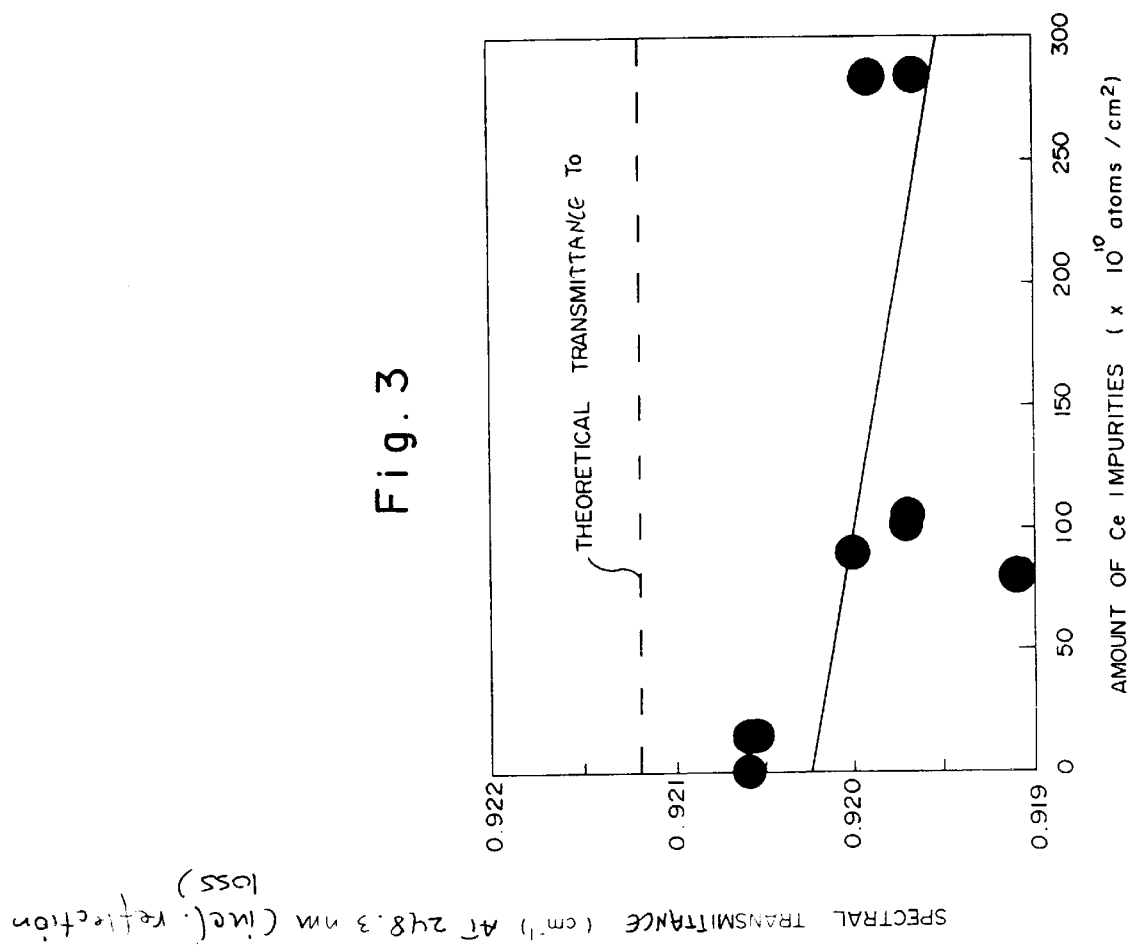
FIG. 3 is a graph that plots the relationship between cerium impurities and transmittance (at 248.3 nm)

Ordinary surface analysis methods, e.g., ESCA methods or methods using a fluorescent X-ray analysis device, have a problem with their sensitivity. Thus, the determination of impurities adhering to the surfaces of optical components is not possible using such methods. FIG. 3 shows the relationship between an amount of $CeO_2$ and the transmittance at 248 nm obtained by an analysis using a total-reflecting fluorescent X-ray analysis device. Here, it is seen that samples with large amounts of residual $CeO_2$ show a large loss. It appears that the reason for this is that the $CeO_2$ polishing agents remains in small cracks of the sample.

However, although surface roughness and the adhesion of $CeO_2$ are some of the factors that make the transmittance decrease, it has been found that these are not the only causes of such a decrease. This is clear from the fact that the transmittance may be lowered 0.5% compared to the theoretical transmittance even in cases where almost no metallic impurities such as $CeO_2$, are detected, and the surface roughness is less than 1 Å RMS.

Consequently, the present inventors surmised that the surface contaminants in such cases probably arise from the adsorption of organic gases. Experiments were conducted accordingly.

First, an optical component (φ 60×10 mm) with a transmittance of 90.55% at 193.4 nm, a surface roughness of 1 Å RMS or less and almost no metallic impurities such as $CeO_2$ (Ce:$50 \times 10^{10}$ atoms/cm$^2$ or less), was stored in a clean room for several days. The transmittance of this optical component was measured after it had been confirmed that virtually no particles were present on the surface of the component. After approximately 24 hours, the transmittance at 193.4 nm had decreased to 90.13%, and after 2 days, the transmittance had decreased to 89.92%.

No significant difference in the quantity of metallic impurities present on the surface of this sample before and after storage in the above-mentioned clean room could be confirmed.

The present inventors inferred from these experiments that the impurities adhering to the surface of the sample were organic impurities. However, even if these contaminants are organic compounds and are removed by cleaning, there is a possibility of re-adhesion during use, thus causing a decrease in the transmittance of the optical component. Unless these problems are solved, the specifications required in optical components used in photolithography cannot be satisfied.

Accordingly, the present invention provides an ultraviolet optical component that is characterized by the fact that no organic impurities are present on the surface, and virtually no adsorption of organic gases has occurred.

The present inventors conducted further experiments concerning the adhesion of organic impurities. The samples that were tested by storage in the above-mentioned clean room were subjected to a peak analysis of the mass numbers corresponding to $H_2O$ and hydrocarbons by means of an analysis device analyzing dissociated gases at elevated temperatures. As a result, it was confirmed that $H_2O$ and hydrocarbons increase with an increase in the storage time in the clean room. This indicated that organic impurities contributed to a decrease in the transmittance along with metallic impurities on the surface. Furthermore, the adhesion of organic impurities is a particular problem because gaseous organic substances emitted from structural materials are present in the atmosphere even in a clean room.

When the present inventors tested various types of cleaning methods and then performed transmittance measurements and a surface analysis including the analysis of impurities, it appeared that acid-treated samples show no decrease in transmittance even when stored for a long period of time, and that organic contaminants tend not to adhere to the surfaces of such samples.

For example, in the case of synthetic fused silica, the HF (hydrofluoric acid or hydrogen fluoride) treatment of surface defects such as ≡Si. and ≡Si—O, in the surface of the glass evidently reduces the number of defects by terminating the defects with H, as in ≡Si—H or ≡Si—O—H, or with F, as in ≡Si—F or ≡Si—O—F. Thus, the formation of electrical bonds with gaseous organic substances becomes more difficult. In other words, physical and chemical adsorption can be prevented. Furthermore, a similar effect can be obtained using acid treatments other than an HF treatment, e.g., a treatment using a 1:1 mixed solution of sulfuric acid and hydrogen peroxide.

Additionally, the degassing effect of heat treatment was investigated. As a result, it was found that the adhesion of impurities could be further prevented by performing a heat treatment before or after the above-mentioned HF treatment. However, it is important that during this heat treatment there are no organic gases and no metallic impurities substantially present in the atmosphere. Furthermore, if the heat treatment is performed prior to the above-mentioned HF treatment, no effect is obtained unless the heat treatment is performed at a temperature of 100° C. or higher. On the other hand, if this heat treatment is performed at a temperature exceeding 900° C., thermal deformation occurs, and there is a possibility of surface crystallization (loss of transparency). Accordingly, heat treatment at such a high temperature is undesirable.

If the heat treatment is performed following the above-mentioned HF treatment and if this heat treatment is performed at a temperature exceeding 1000° C., the terminated ≡Si—H and ≡Si—O—H structures may react so that $H_2O$ is emitted. Another possibility is that the terminated ≡Si—F or ≡Si—O—F structures may react so that HF or $F_2$ is omitted, thus again producing surface defects.

Accordingly, the present invention provides a method for manufacturing ultraviolet optical components that is characterized by the fact that the optical components are subjected to a heat treatment at a temperature of 100 to 1000° C. either before or after the surfaces of the optical components are subjected to an HF treatment.

Furthermore, the upper limit on the temperature during the above-mentioned heat treatment depends on the material of the optical components. For example, in the case of synthetic fused silica, there is a danger of deformation of the synthetic fused silica at temperatures higher than 500° C. Accordingly, it is desirable that the temperature of the above-mentioned heat treatment be 500° C. or less.

In the case of fluorite, there is a danger of cracking at temperatures exceeding 300° C. In this case, therefore, it is desirable that the heat treatment temperature be 300° C. or less.

In the case of multi-component optical glass, there is a danger of deformation at temperatures exceeding 400° C. (although this varies according to the composition). Accordingly, a heat treatment temperature of 400° C. or less is desirable.

Furthermore, when an optical component manufacturing method includes a thin film coating process following the polishing and cleaning of the optical components, the process may be combined with a heat treatment process. In this case, it is desirable to keep the treatment temperature within the above-mentioned ranges.

Moreover, when components are actually used as ultraviolet optical components, it is necessary to investigate the removal not only of organic impurities, but also of metallic impurities that might conceivably be present in fine cracks in the polished surface. Accordingly, the adhesion of metallic impurities can be prevented by polishing the surface layers with fine particles of $SiO_2$ in a final polishing process following the formation of prescribed curved surfaces and flat surfaces using an ordinary polishing agent such as, for example, $CeO_2$.

Furthermore, even after organic impurities have been carefully cleaned away by performing an HF treatment, organic contaminants, e.g., contaminants from packaging materials or human hands, may adhere to the surfaces of the optical components during shipping. It was found that such contaminants can be removed by drying the optical components with an IPA solution and IPA vapor, and then performing UV cleaning using an Hg lamp, or excimer laser cleaning using a KrF or ArF excimer laser, immediately prior to the installation of the optical components in the optical system jig. Furthermore, even when optical components are not subjected to an HF treatment or heat treatment, organic contaminants can be temporarily removed by such cleaning treatments. However, re-adhesion of the contaminants will occur as a result of surface defects. The above-mentioned HF treatment and heat treatment are essential in order to prevent such re-adhesion of contaminants.

In the optical components thus obtained, there is no adsorption of impurities, and a high transmittance can be achieved. However, since surface roughness also has an effect on surface loss, it is desirable that the surface roughness is 10 Å or less.

The present invention will be described below in greater detail in terms of experimental results. Synthetic fused silica having the same optical quality were used for samples. The samples used were polished parallel flat plates with approximate dimensions of φ 60×t10 mm. The degree of parallelism of the respective flat plate samples was 5±1 sec, and the surface precision was 3±0.5λ.(λ=546 nm). Forty-five samples were prepared, and the conditions of the optical component manufacturing method of the present invention were varied as described below, with three samples being treated under identical conditions in each case. The transmittance of the samples was then measured at 193.4 nm. The respective treatment conditions were fixed for purposes of comparison. The results obtained are summarized in FIG. 4. The circles in the table indicate that the treatment in question was performed, while the X signs indicate that the treatment in question was not performed.

FIG. 4 shows the differences in transmittance at 193.4 nm obtained using the optical component manufacturing method of the present invention and a comparative optical component manufacturing method. In FIG. 4, the following designations are used:

a. Surface Roughness(Å RMS);

b. Final Polishing ($SiO_2$);

c. HF Treatment (10%, 1 minute);

d. Heat Treatment (see also Note 1);

e. UV Treatment (see also Note 2);

f. Transmittance at 193.4 nm (see also Note 3);

g. Immediately Following UV Irradiation;

h. After 240 hours.

Where:

Note 1: Treatment for 10 minutes at 200° C.

Note 2: Treatment for 5 minutes with Hg lamp (185 nm: 1 $mW/cm^2$, 254 nm: 10 $mW/cm^2$), irradiation at a distance of 1 cm from the lamp.

Note 3: Calculated value of internal transmittance with theoretical value set at 100%, and with reflection loss assumed to be zero.

Note 4: Value measured immediately after working

Furthermore, the surface roughness was measured by means of an optical measuring apparatus using a heterodyne interferometer, and was expressed in terms of Å RMS. The final polishing was performed using fine particles of colloidal $SiO_2$, following polishing with $CeO_2$. The HF treatment was performed using a 10% aqueous solution of HF; the optical components were immersed for approximately 1 minute, and were then rinsed with ultra-pure water, immersed in IPA, and dried with IPA vapor. The heat treatment was performed for 10 minutes at 200° C. in an atmosphere that was substantially free of metallic impurities and organic gases. The UV treatment was performed in order to eliminate the effects of shipping. An Hg lamp was used as a light source, and the respective irradiation intensities at 185 nm and 254 nm were 1 $mW/cm^2$ and 10 $mW/cm^2$. In this treatment, organic substances in the polar surface layer were decomposed by UV light, and the decomposed organic substances were eliminated as $H_2O$ and $CO_2$ gas by the ozone produced by the bright line at 185 nm, and by the active oxygen broken down from ozone by the bright line at 254 nm.

Figure 1:
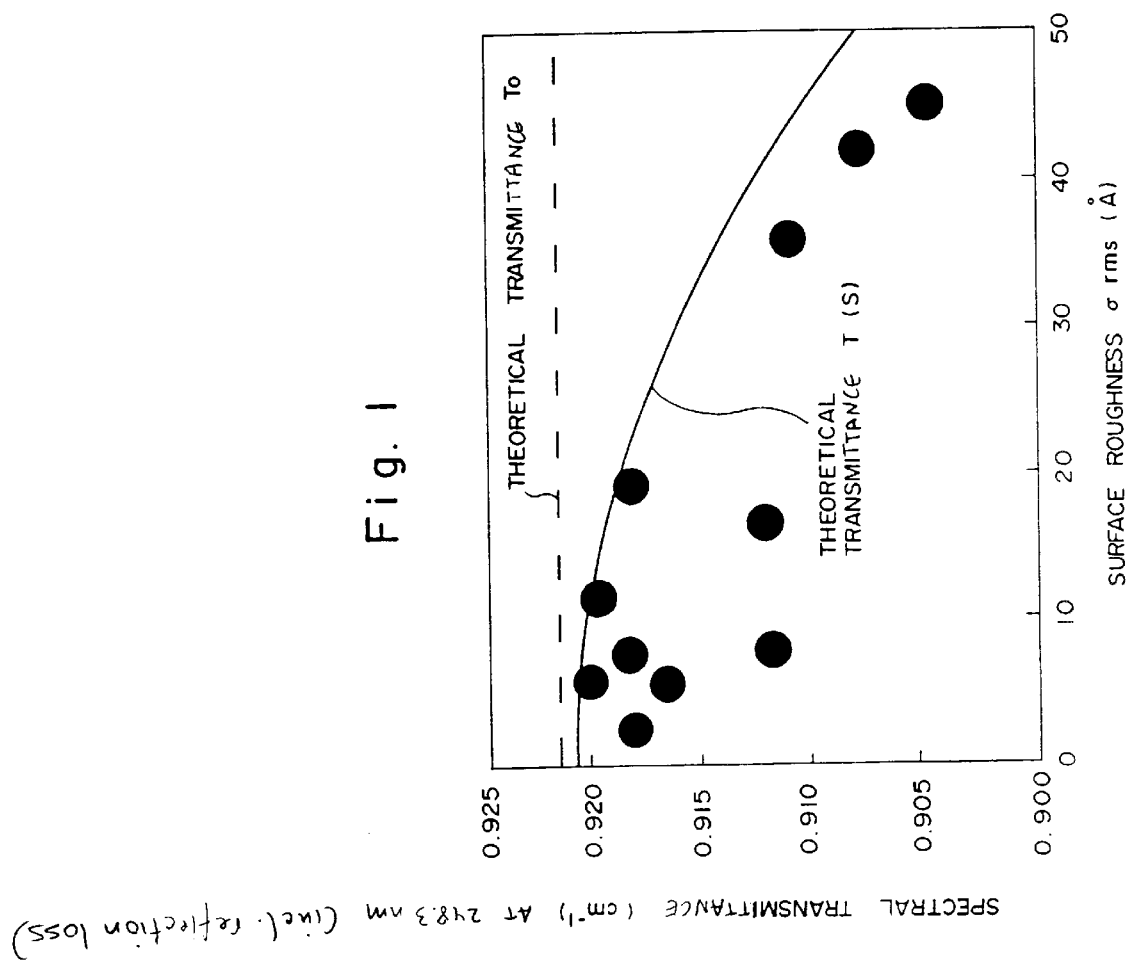
FIG. 1 is a graph that plots the relationship between surface roughness and transmittance (at 248.3 nm)

In FIG. 1 the vertical axis represents transmittance including reflection loss at 248.3 nm (%/cm), and the horizontal axis represents surface roughness (Å RMS).

Figure 2:
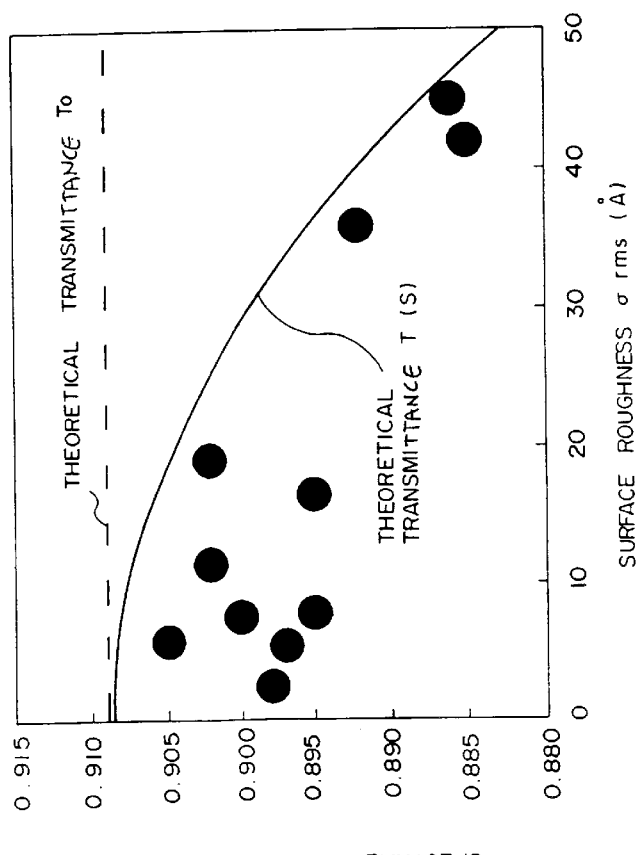
FIG. 2 is a graph that plots the relationship between surface roughness and transmittance (at 193.4 nm)

In FIG. 2 the vertical axis represents transmittance including reflection loss at 193.4 nm (%/cm), and the horizontal axis represents surface roughness (Å RMS).

In FIG. 3 the vertical axis represents transmittance including reflection loss at 248.3 nm (%/cm), and the horizontal axis represents quantity of Ce impurity ($\times 10^{10}$ atoms/cm$^2$).

Before discussing the details of the preferred embodiments of the present invention, the understanding of the present invention will be aided by reference to Experimental Samples described below and illustrated in FIGS. 1–4. It is to be understood that the invention should not be construed as being limited to these Experimental Samples.

Experimental Sample 1

An optical component I was manufactured by the optical component manufacturing method of the present invention, and the internal transmittance of this component at 193.4 nm was measured. The value measured immediately following UV irradiation was 99.86%. The transmittance following 240 hours of storage in the above-mentioned clean room was 99.84%, and thus showed almost no decrease. When internal scattering loss is taken into consideration, this numerical value indicates a surface loss of less than 0.05% on both surfaces. Since the surface loss is small, this optical component is especially suitable for use in excimer laser lithography. For example, the number of optical components in an ArF excimer laser stepper is nearly 100 components (including the components in both the illumination lens system and the projection lens system). Thus, the surface loss of the overall optical system caused by process contamination other than reflection loss attributable to thin-film performance can be kept to approximately 10% or less. This means that sufficient performance may be expected not only in terms of through-put, but also in terms of imaging performance. However, since other loss factors, including the monitor optical system and aperture diaphragms, are also present, the actual through-put of the overall optical system is considerably less than 90%.

Experimental Sample 2

An optical component J whose surface roughness was worked to 5 Å RMS, and an optical component H whose surface roughness was worked to 10 Å RMS, were manufactured by the same manufacturing method used to manufacture the above-mentioned optical component I in the Experimental Sample 1.

The transmittance of the above-mentioned optical component J immediately following UV irradiation was 99.80%, and the transmittance measured after 240 hours of storage in the above-mentioned clean room was 99.80%. Thus, no decrease in transmittance was seen.

The transmittance of the above-mentioned optical component H immediately following UV irradiation was 99.72%, and the transmittance measured after 240 hours of storage in the above-mentioned clean room was 99.71%. Thus, almost no decrease in transmittance was seen.

The slightly lower transmittance values shown by both optical components J and H compared to the above-mentioned optical component I are thought to be due to scattering loss caused by surface roughness.

If internal scattering loss is taken into consideration, the optical component J shows a surface loss of less than 0.1%. Since the surface loss is relatively small, this optical component is especially suitable for use in excimer laser lithography. For example, the number of optical components in an ArF excimer laser stepper is nearly 100 components (including the components in both the illumination lens system and the projection lens system). If the above-mentioned optical component J of the present invention is used, the total lens surface loss of the entire optical system is approximately 10%. This value provides sufficient performance not only in terms of through-put, but also in terms of imaging performance. However, a larger loss would have a deleterious effect on performance. Accordingly, a surface roughness of 5 Å RMS or less is desirable.

Experimental Sample 3

An optical component E was manufactured by the same method used to manufacture the above-mentioned optical component I of the present invention, except that the HF treatment was omitted. The internal transmittance of this optical component at 193.4 nm was measured. The transmittance measured immediately following the UV irradiation treatment was 99.65%, and the transmittance measured after 240 hours of storage in the clean room was 99.25%. Since no HF treatment was performed, the removal of metallic impurities and organic impurities was insufficient, as was the reduction in the quantity of surface defects.

Experimental Sample 4

An optical component F was manufactured by the same method used to manufacture the above-mentioned optical component I of the present invention, except that the heat treatment was omitted. The internal transmittance of this optical component at 193.4 nm was measured. The transmittance measured immediately following the UV irradiation treatment was 99.76%, and the transmittance measured after 240 hours of storage in the clean room was 99.74%. Since no heat treatment was performed, the removal of organic impurities was slightly insufficient, as was the reduction in the quantity of surface defects.

Experimental Sample 5

An optical component G was manufactured by the same manufacturing method as that used for optical component I of the present invention, except that the UV treatment was omitted. The internal transmittance of this optical component at 193.4 nm was measured. The transmittance value measured immediately after IPA immersion+IPA vapor drying (following the completion of finishing) was 99.80%, and the transmittance measured following storage for 240 hours in a clean room was 99.78%.

In this case, since the removal of organic impurities was somewhat insufficient compared to optical component I, the transmittance was slightly low. However, this optical component is still usable in excimer laser lithography.

Experimental Sample 6

An optical component was manufactured using the same procedure as in the manufacturing method used to produce optical component G, except that the heat treatment was performed first, and the HF treatment was performed afterward. The internal transmittance of this optical component at 193.4 nm was measured. This optical component will be referred to as G'. The transmittance value measured immediately after IPA immersion+IPA vapor drying (following the completion of finishing) was 99.82%, and the transmittance measured following retention for 240 hours in the above-mentioned clean room was 99.78%.

Like optical component G, this optical component G' showed a somewhat insufficient removal of organic impurities compared to optical component I. Accordingly, the transmittance was slightly low. However, this optical component is still usable in excimer laser lithography.

Experimental Sample 7

An optical component K, which was coated on both sides with an anti-reflection coating, was manufactured by the same procedure as in the manufacturing method used for optical component G, using a substrate with a diameter of 30 mm and a thickness of 3 mm manufactured by the same manufacturing method as that used for optical component I. In this case, since the optical component was heated to a temperature of 150 to 300° C. in the thin film coating process, this was substituted for the heat treatment process of the present invention. The transmittance of this optical component at 193.4 nm was measured. The transmittance value measured immediately after IPA immersion+IPA vapor drying (following the completion of finishing) was 99.80%, and the transmittance measured following retention for 240 hours in the above-mentioned clean room was 99.75% This component was coated with an anti-reflection coating and had a one-side reflection loss of 0.05% in terms of the design value. Furthermore, since the sample thickness was small, internal absorption/internal scattering could be more or less ignored. Accordingly, the surface loss other than reflection loss was 0.15% on both sides. The fact that the increase in loss that occurred when the component was allowed to stand was slightly larger than that seen in the case of the substrate alone is thought to be attributable to the fact that the surface area of the coating film was larger than the surface area of the substrate.

Since the removal of organic impurities was somewhat insufficient, there was some surface loss; however, this optical component is still usable in excimer laser lithography.

Experimental Sample 8

An optical component K', which was coated on both sides with an anti-reflection coating, was manufactured by the same procedure as in the manufacturing method used for optical component G', using a substrate with a diameter of 30 mm and a thickness of 3 mm manufactured by the same manufacturing method as that used for optical component I. In this case, since the optical component was heated to a temperature of 150 to 300° C. in the thin film coating process, this was substituted for the heat treatment process of the present invention. The transmittance of this optical component at 193.4 nm was measured. The transmittance value measured immediately after IPA immersion+IPA vapor drying (following the completion of finishing) was 99.80%, and the transmittance measured following retention for 240 hours in the above-mentioned clean room was 99.75% This component was coated with an anti-reflection coating and had a one-side reflection loss of 0.05% in terms of the design value. Furthermore, since the sample thickness was small, internal absorption/internal scattering could be more or less ignored. Accordingly, the surface loss other than reflection loss was 0.15% on both sides. The fact that the increase in loss that occurred when the component was allowed to stand was slightly larger than that seen in the case of the substrate alone is thought to be attributable to the fact that the surface area of the coating film was larger than the surface area of the substrate.

Since the removal of organic impurities was somewhat insufficient, there was some surface loss, however, this optical component is still usable in excimer laser lithography.

Experimental Sample 9

An optical component L, which was coated on both sides with an anti-reflection coating, was manufactured by the same procedure as in the manufacturing method used for optical component I, using a substrate with a diameter of 30 mm and a thickness of 3 mm manufactured by the same manufacturing method as that used for optical component I. In this case, since the optical component was heated to a temperature of 150 to 300° C. in the thin film coating process, this was substituted for the heat treatment process of the present invention. The transmittance of this optical component at 193.4 nm was measured. The transmittance value measured immediately after IPA immersion+IPA vapor drying (following the completion of finishing) was 99.85%, and the transmittance measured following retention for 240 hours in the above-mentioned clean room was 99.80% This component was coated with an anti-reflection coating and had a one-side reflection loss of 0.05% in terms of the design value. Furthermore, since the sample thickness was small, internal absorption/internal scattering could be more or less ignored. Accordingly, the surface loss other than reflection loss was 0.05% on both sides.

The surface conditions of this component were extremely good, and the value of the surface loss was extremely low. This optical component is usable in excimer laser lithography.

Comparative Sample 1

An optical component A was manufactured using a conventional optical component manufacturing method, and the internal transmittance of this optical component at 193.4 nm was measured. The transmittance immediately following UV irradiation was 98.95%, while the transmittance after 240 hours of storage in the above-mentioned clean room was 98.25%. Since the surface loss is large, this optical component is especially unsuitable for use in excimer laser lithography. For example, since the number of optical components in an ArF excimer laser stepper is nearly 100 components (including the components in both the illumination lens system and the projection lens system), the overall transmittance loss due to surface loss alone is approximately 17% in the case of this optical component. This affects not only through-put, but also imaging performance.

Comparative Sample 2

An HF treatment only was additionally performed in a conventional optical component manufacturing method. In the resulting optical component B, the transmittance at 193.4 nm immediately following UV irradiation was 99.45%, and the transmittance after 240 hours of storage in the above-mentioned clean room was 99.38%. The transmittance was improved as a result of the above-mentioned HF treatment; however, since no final polishing using fine particles of $SiO_2$ was performed, it appears that metallic impurities remained. It might be possible to remove these impurities by increasing the HF treatment time. However, a lengthy HF treatment generates scratches in the surface, thus leading to a deterioration in surface roughness, and is therefore not advisable.

Comparative Sample 3

An $SiO_2$ final polishing treatment only was additionally performed in a conventional optical component manufacturing method. In the resulting optical component C, the transmittance at 193.4 nm immediately following UV irradiation was relatively good at 99.56%. However, the transmittance after 240 hours of storage in the above-mentioned clean room was 99.15%. The transmittance was improved as a result of the above-mentioned final polishing treatment with fine particles of $SiO_2$; however, since no HF treatment was performed, the removal of metallic impurities and organic impurities, and the reduction of the quantity of surface defects were insufficient.

Comparative Sample 4

A heat treatment only was additionally performed in a conventional optical component manufacturing method. In the resulting optical component D, the surface loss was large, i.e., the transmittance at 193.4 nm immediately following UV irradiation was 99.15%, and the transmittance after 240 hours of storage in the above-mentioned clean room was 98.58%. The transmittance was slightly improved as a result of the above-mentioned heat treatment; however, since no HF treatment was performed, the removal of metallic impurities and organic impurities, and the reduction of the quantity of surface defects were insufficient.

The method of the present invention for manufacturing optical components makes it possible to manufacture optical components for use in photolithography that have a reduced surface loss. In particular, the present invention provides an essential technique for improving the performance of lenses in the illumination lens system and projection lens system in KrF and ArF excimer laser steppers that use an ultraviolet light source with a wavelength of 300 nm or less.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for manufacturing an optical component comprising the steps of:
   cutting out a part from a block of glass; then
   polishing optical sides of the part; then
   subjecting the part to acid treatment; and then
   subjecting the part to heat treatment at a temperature of between 100° C. and 900° C.

2. The method of claim 1, wherein the acid treatment utilizes a compound selected from a group consisting of hydrofluoric acid and hydrogen fluoride.

3. The method of claim 1, wherein the method further comprises subjecting the part to an ultraviolet treatment.

4. The method of claim 1, wherein the heat treatment is a thin film coating process wherein a thin film is formed on the sides of the part.

5. The method of claim 1, wherein the block of glass comprises high purity synthetic fused silica and the temperature of the heat treatment is between 100° C. and 500° C.

6. The method of claim 1, wherein the optical component has a transmittance of 99.5% or greater, an amount of organic impurities is minimized, and adsorption of organic gases is minimized.

7. The method of claim 1, wherein the optical sides of the optical component have a surface roughness of 10 Å or less.

8. The method of claim 7, wherein the optical component has a transmittance of 99.5% or greater, an amount of organic impurities is minimized, and adsorption of organic gases is minimized.

9. The method of claim 1, wherein the polishing utilizes fine particles of $SiO_2$.

10. A method for manufacturing an optical component comprising the steps of:
    cutting out a part from an optical block material; then
    polishing optical sides of the part; then
    subjecting the part to acid treatment; then
    subjecting the part to an ultraviolet treatment; and then
    subjecting the part to heat treatment at a temperature of between 100° C. and 900° C.

11. The method of claim 10, wherein the acid treatment utilizes a compound selected from a group consisting of hydrofluoric acid and hydrogen fluoride.

12. The method of claim 10, wherein the heat treatment is a thin film coating process wherein a thin film is formed on the sides of the part.

13. The method of claim 10, wherein the optical block material comprises high purity synthetic fused silica and the temperature of the heat treatment is between 100° C. and 500° C.

14. The method of claim 10, wherein the optical component has a transmittance of 99.5% or greater, an amount of organic impurities is minimized, and adsorption of organic gases is minimized.

15. The method of claim 10, wherein the optical sides of the optical component have a surface roughness of 10 Å or less.

16. The method of claim 15, wherein the optical component has a transmittance of 99.5% or greater, an amount of organic impurities is minimized, and adsorption of organic gases is minimized.

17. The method of claim 10, wherein the polishing utilizes fine particles of $SiO_2$.

18. The method of claim 1, wherein the block of glass is made of synthetic fused silica, and the heat treatment is at a temperature of between 100° C. and 500° C.

19. The method of claim 1, wherein the block of glass is multi-component glass, and the heat treatment is at a temperature of between 100° C. and 400° C.

20. The method of claim 10, wherein the optical block material is made of synthetic fused silica, and the heat treatment is at a temperature of between 100° C. and 500° C.

21. The method of claim 10, wherein the optical block material is calcium fluoride, and the heat treatment is at a temperature of between 100° C. and 300° C.

22. The method of claim 10, wherein the optical block material is multi-component glass, and the heat treatment is at a temperature of between 100° C. and 400° C.

23. A method for manufacturing an optical component comprising the steps of:
    cutting out a part from an optical block material; then
    polishing optical sides of the part with an abrasive agent; then
    subjecting the part to heat treatment at a temperature of between 100° C. and 900° C.; and then cleaning the part with acid treatment, wherein the optical component has a transmittance of 99.5% or greater, an amount of organic impurities is minimized, and adsorption of organic gases is minimized.

24. The method of claim 23, wherein the optical sides of the optical component have a surface roughness of 10 Å or less.

* * * * *